D. S. GROSE.
AUTOPLOW.
APPLICATION FILED JAN. 5, 1914.
1,115,666. Patented Nov. 3, 1914.
3 SHEETS—SHEET 1.
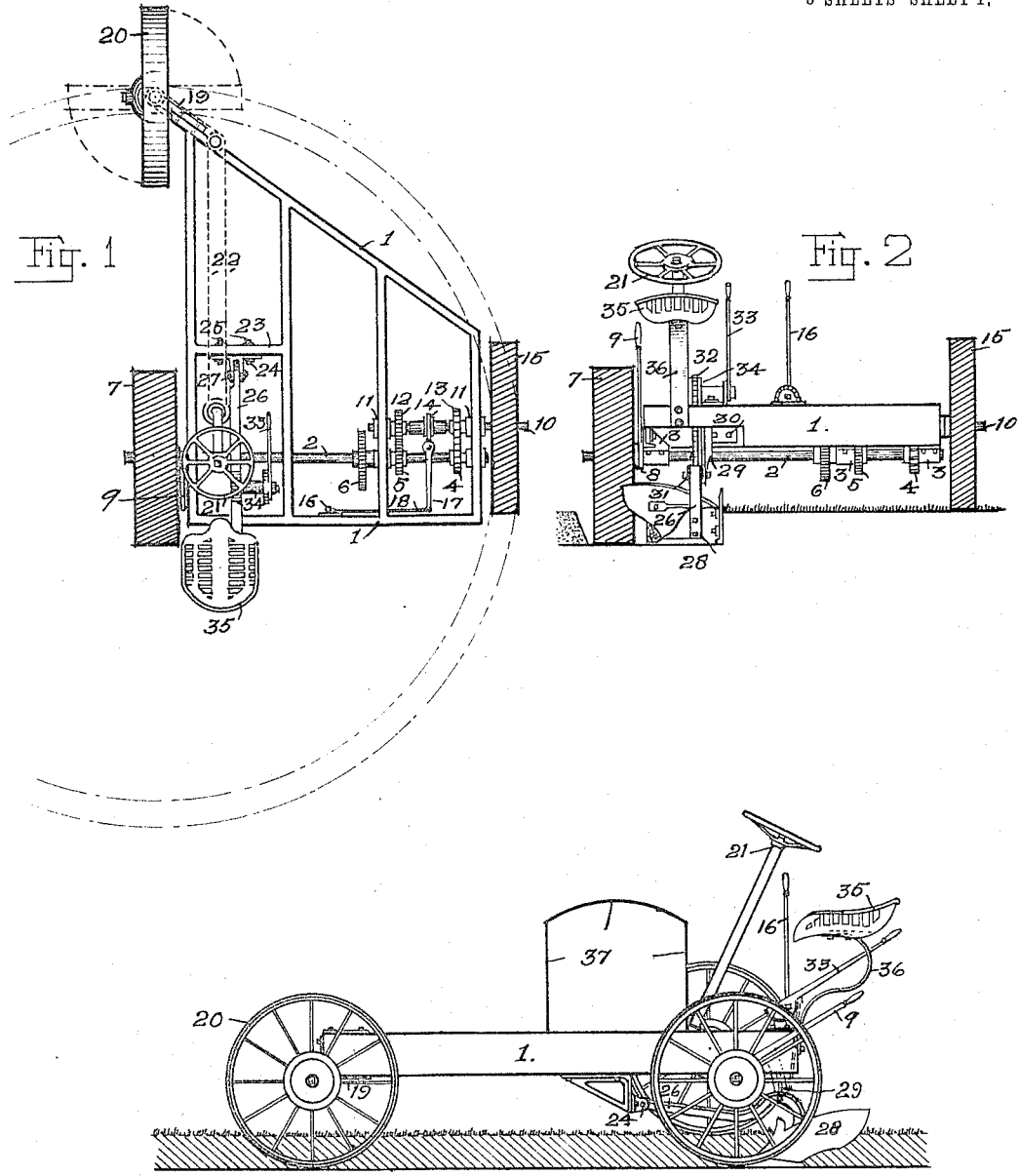
Witnesses.
James M. Maurin
Sidney ...
Inventor:
David S. Grose
By Richard D. Watson
His Attorney

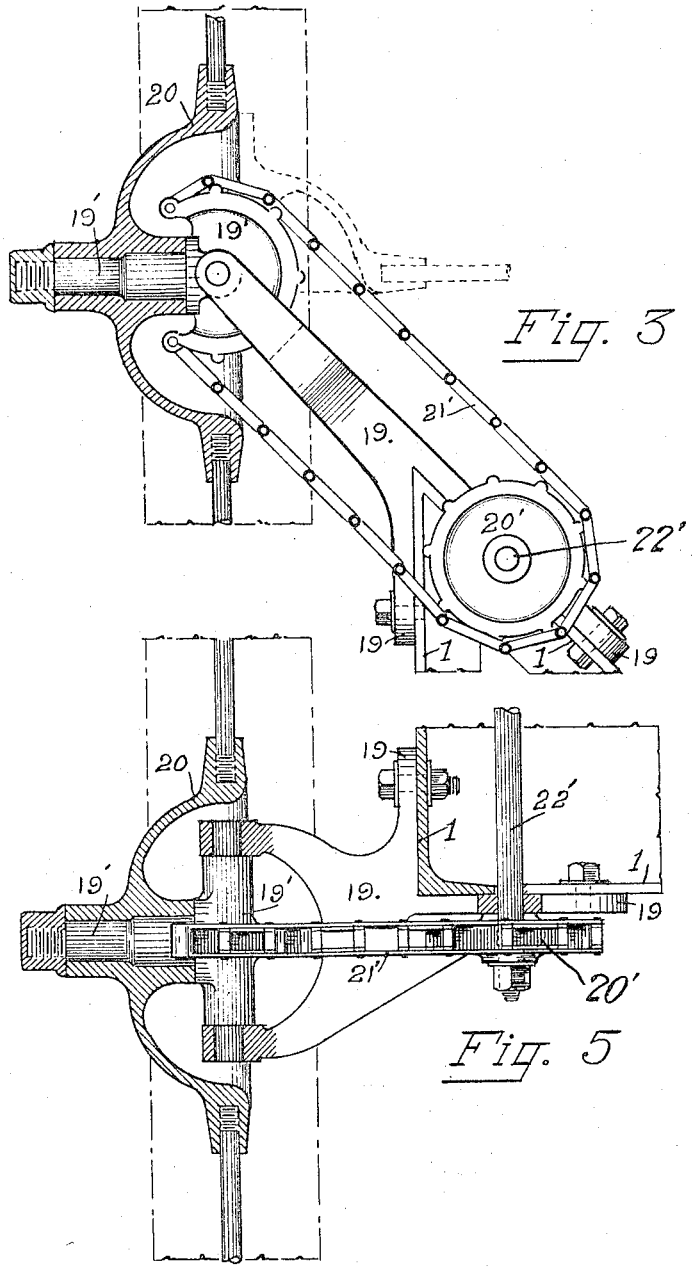

UNITED STATES PATENT OFFICE.

DAVID S. GROSE, OF FINDLAY, OHIO.

AUTOPLOW.

1,115,666.  Specification of Letters Patent.  Patented Nov. 3, 1914.

Application filed January 5, 1914. Serial No. 810,283.

*To all whom it may concern:*

Be it known that I, DAVID S. GROSE, a citizen of the United States, residing at Findlay, in the county of Hancock and State of Ohio, have invented a new and useful Improvement in Autoplows, of which the following is a specification.

My invention relates to a tractor plow that is adapted to the plowing of small areas, and has for its object, first, it is easy to operate, second, to avoid packing the soil after the same has been plowed, and third, to do the plowing rapidly and in a good workmanlike manner. To accomplish these objects, I have produced a unit device, that is, one in which the plow and the power to operate it are in one, having the plow proper so spaced in relation to the tractor wheels that the very important matter of turning is done on the most rapid and easiest known principle, viz: a pivotal action; also that the plow is adjustable to depths and widths of cut, and further that the plow is adjustable to lead to or from the land side, as is necessary to suit the conditions of different soils.

The accompanying drawings illustrate my invention attaining said objects, in which—

Figure 6:
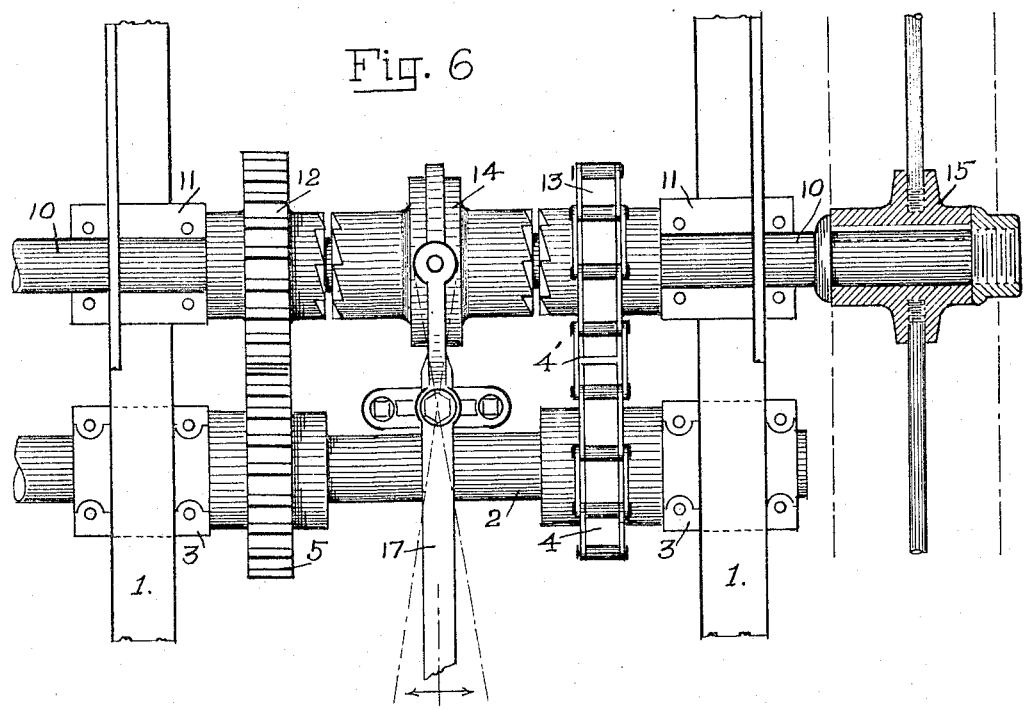
Figure 7:
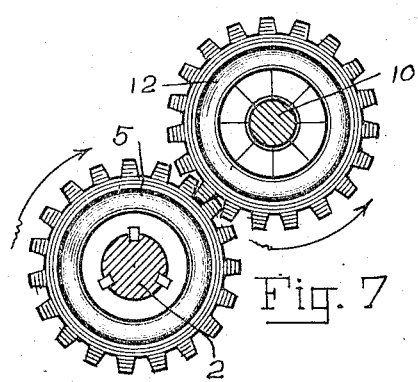
Figure 8:
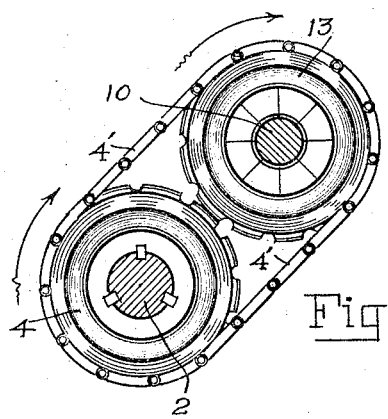

Figure 1 is a plan view. Fig. 2 is a rear view. Fig. 3 is a plan of steering wheel hub and spindle. Fig. 4 is a side view. Fig. 5 is a side view of the steering wheel, hub and spindle. Fig. 6 is a plan view of reversing mechanism. Fig. 7 is a view of duplicate gear for right hand turns, and Fig. 8 is a view of duplicate sprockets for left hand turn.

Similar numerals refer to similar parts throughout the several views.

1 designates the frame, to which is revolubly secured the main axle 2, by bearings 3. On the shaft 2 is rigidly secured the sprocket 4, the gear wheel 5, the motor connection gear wheel 6, and main tractor wheel 7 having a clutch connection 8 controlled by the lever 9. The shaft 10 is mounted in bearings 11 to the frame 1 spaced forward and at a height above shaft 2 at the ordinary plow depth, say six inches. By said spacing of the secondary axle the carrying frame is level when actually at work and that it is not so other times is not important. On the shaft 10 is revolubly mounted the gear wheel 12, the sprocket 13, the slidably keyed right and left double clutch 14, and the rigidly mounted secondary traction wheel 15. The double clutch 14 is adapted to engage the toothed hub of the gear 12 for moving backward, or the toothed hub of sprocket wheel 13 for forward movement, or to be freed from either or both by the lever 16 connected with the lever 17 by the connecting rod 18.

To the main frame 1 is rigidly secured the fork 19 in which is revolubly mounted the combined semi-sprocket and axle 19' and sprocket 20' rigidly mounted on its shaft 22' which is revolubly secured to the main frame 1. Chain belt 21' is fastened with a hinge connection to one terminal of said semi-sprocket and is continuously stretched around sprocket 20' and in like manner secured to the other terminal of semi-sprocket 19'. The steering wheel with its cup hub 20 is revolubly mounted on axle 19' and has a duplicate sprocket mounted on shaft 22' sprocket 20' and a chain belt 22 connecting said duplicate sprocket to a steering column on which is mounted hand steering wheel 21 by which wheel 20 can be set and held at a straightforward direction or at right angles thereto or to any angular position up to 90° therefrom.

To the cross member 23 of the frame 1 is secured the clevis 24 which is adjustable right and left by the bolts 25 through slotted holes in its base, and to which is hinged the plow beam 26 by bolt 27. To said beam is secured the plow 28 which is secured from lateral motion by the slotted stay 29, which is secured to frame 1 by the bolts 30 and to the plow by the stud 31.

To the frame 1 is secured the winding drum 32, controlled by the lever 33. To the drum 32 is adjustably secured the upper end of chain 34, the lower end of which is secured to the plow beam 26, by which means the plow can be set and held at any desired depth of cut or held entirely above the land. The operator's seat 35 and its spring support 36 are secured to the frame 1 at a position which affords the operator easy reach of the levers 9, 16, 33 and the steering wheel 21 by which the plow is controlled, and also with a clear view of the work as it is being done.

The motive power, which may be any suitable one is not shown in Figs. 1 and 2, in order not to obscure other details, but in Fig. 4 the outlines 37 of a hood are shown so that its location is near the main tractor wheel for the purpose of placing the most weight on said wheel, and with the position of the plow and also the operator, that end is accomplished.

Thus constructed the operation is as follows: In a straight forward movement, as shown in Fig. 1, the main drive wheel 7 and the steering wheel 20 are in alinement, the clutch 8 controlled by lever 9 is in engagement to the drive wheel 7, and clutch 14 is in engagement with sprocket 13, to drive wheel 10 forward, and with a motor connected to gear 6 and turning shaft 2 forward, its force is transmitted to wheels 7 and 15 and tends to move the entire machine straight ahead and any tendency to deviate therefrom can be controlled by the wheel 21. When a turn is to be made to the left clutch 8 is thrown out of engagement with wheel 7 and clutch 14 out of engagement with sprocket 13 which stops forward movement while the motor runs idle and steering wheel 20 is turned at right angles to the straight ahead line. The clutch 14 is moved to engagement with the sprocket 13 which transmits all of the motor force to the wheel 15 which will drive the steering wheel 20 and the wheel itself will travel in a true circle, as indicated by dot and dash lines, as if pivoted at the center of wheel 7. When a right hand turn is to be made the clutch 14 is moved to connection with gear 12, which gives backward movement to the wheel 15, which travels backward as indicated by dotted and dash lines, and the wheel 20 follows on a like curve.

It is plainly seen by Figs. 2 and 4 of the drawings herewith that the main drive wheel 7 and steering wheel 20 track on the bottom of the furrows previously made and below the plowed portion of the soil and therefore does not pack either before or after the plowing is done.

Referring to the object of ease of operation, as set forth, I would call especial attention to making the turn, which is the time waste of all self-propelling apparatus, as while doing so no actual work is being accomplished and that by my combination of parts the minimum load is carried the least needful distance in making a turn and gives the maximum of economy, time and power.

While the steering mechanism shown and described is preferably used, it is manifest that other steering mechanism may be substituted without departing from the principle of construction and operation of my invention and I therefore do not limit myself to the steering mechanism shown and described and it is also manifest that said steering mechanism is applicable for use in other motor driven vehicles. I do not therefore specifically claim the same herein, but make it the subject of a separate application.

What I claim to be new is—

In an autoplow, a frame, a main driving axle journaled transverse the frame, a secondary axle journaled in the frame parallel with the main axle, a main tractor wheel journaled on one end of the main axle and having a hub adapted at its inner end as a clutch member, a secondary tractor wheel fixedly mounted on the opposite end portion respectively of the secondary axle, a clutch member slidably keyed on the main axle, means to engage the clutch member with and disengage it from the hub of the main tractor wheel, a pair of companion intermeshing gear wheels, one fixedly mounted on the main axle and the other revolubly mounted on the secondary axle, and having the inner end of its hub adapted as a clutch member, a pair of sprocket wheels, one fixedly mounted on the main axle and the other revolubly mounted on the secondary axle and having it hub adapted as a clutch member, a sprocket chain belt connecting the sprocket wheels, a clutch member slidably keyed on the secondary axle between its gear wheel and its sprocket wheel, a lever connected to the clutch member of the secondary axle and adapted to engage the clutch member with either the sprocket or the gear wheel of the secondary axle and to disconnect it from both, a steering wheel axle pivoted to the forward end of the frame to swing through a horizontal arc of 90°, a steering tractor wheel mounted on the steering wheel axle, means to control the steering axle and wheel, an operator's seat mounted on the rear of the frame convenient to the means of operation, and means to rotate the main axle.

In testimony whereof I have hereunto set my hand at Findlay, in the county of Hancock and State of Ohio, this 2nd day of January, 1914, in the presence of two subscribing witnesses.

DAVID S. GROSE.

In presence of—
GRACE SHANK,
CHARLES E. JORDAN.